United States Patent
Lin et al.

(10) Patent No.: US 8,358,243 B2
(45) Date of Patent: Jan. 22, 2013

(54) METHODS AND APPARATUSES FOR REQUESTING/PROVIDING SENSITIVITY ASSISTANCE INFORMATION ASSOCIATED WITH VARIOUS SATELLITE POSITIONING SYSTEMS IN WIRELESS COMMUNICATION NETWORKS

(75) Inventors: Ie-Hong Lin, Cupertino, CA (US); Douglas Neal Rowitch, Del Mar, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 12/501,291

(22) Filed: Jul. 10, 2009

(65) Prior Publication Data

US 2010/0013702 A1    Jan. 21, 2010

Related U.S. Application Data

(60) Provisional application No. 61/082,112, filed on Jul. 18, 2008.

(51) Int. Cl.
*G01S 19/05* (2010.01)
*G01S 19/25* (2010.01)
*G01S 19/33* (2010.01)

(52) U.S. Cl. .......... 342/357.42; 342/357.64; 342/357.73

(58) Field of Classification Search ............... 342/357.4, 342/357.42, 357.64, 357.73
See application file for complete search history.

(56) References Cited

U.S. PATENT DOCUMENTS

| | | | | |
|---|---|---|---|---|
| 6,861,980 B1* | 3/2005 | Rowitch et al. | .......... | 342/357.31 |
| 7,701,387 B2* | 4/2010 | Syrjarinne | ............. | 342/357.42 |
| 2003/0023379 A1 | 1/2003 | Diggelen et al. | | |
| 2004/0162052 A1* | 8/2004 | Jang et al. | ................. | 455/404.2 |
| 2006/0250302 A1* | 11/2006 | Park et al. | ................. | 342/357.1 |
| 2006/0290566 A1* | 12/2006 | Syrjarinne et al. | ....... | 342/357.15 |
| 2007/0299609 A1 | 12/2007 | Garin et al. | | |

FOREIGN PATENT DOCUMENTS

| | | | |
|---|---|---|---|
| EP | 1736792 A1 | * | 12/2006 |
| WO | WO 2007099196 A1 | * | 9/2007 |
| WO | WO2008035143 A1 | | 3/2008 |

OTHER PUBLICATIONS

Syrjarinne, J. et al, "Setting a New Standard: Assisting GNSS Receivers That Use Wireless Networks," InsideGNSS, )ct. 2006, pp. 26-31.*
Wirola, L. et al, "Bringing All GNSSs into Line: New Assistance Standards Embrace Galileo, GLONASS, QZSS, SBAS," GPS World, Sep. 2007, pp. 40-47.*
3GPP Draft; GP-062185, Nov. 8, 2006 3rd Generation Partnership Project (3GPP), Mobile Competence Centre ; 650, route des Lucioles ; F-06921 Sophia-Antipolis Cedex ; France, vol. TSG GERAN, Nr:Sophia; XP050017174 [retrieved on Nov. 8, 2006] p. 47, GANSS navigation model p. 48 non-broadcast indication and table A.46.
International Search Report and Written Opinion—PCT/US2009/051060—ISA/EPO—Nov. 11, 2009.
3GPP2 C.S0022-A, Version 1.0, 3rd Generation Partnership Project 2 "3GPP2", Position Determination Service for cdma 2000 Spread Spectrum Systems, Mar. 2004, www.3gpp2.org.
3GPP2 C.30022, Version 1.0, 3rd Generation Partnership Project 2 "3GPP2", Location Services (Position Determination Service), www.3gpp2.org.
3GPP2 C.S0022, Version 3.0, 3rd Generation Partnership Project 2 "3GPP2", Position Determination Service Standard for Dual Mode Spread Spectrum Systems, Feb. 16, 2001, www.3gpp2.org.

* cited by examiner

*Primary Examiner* — Gregory C Issing
(74) *Attorney, Agent, or Firm* — Andrea Mays; Arnold J. Gum

(57) ABSTRACT

Methods and apparatuses are provided for use by devices within a wireless communication network to request and/or provide sensitivity assistance information signals associated with one or more Satellite Positioning Systems (SPSs).

58 Claims, 7 Drawing Sheets

METHODS AND APPARATUSES FOR REQUESTING/PROVIDING SENSITIVITY ASSISTANCE INFORMATION ASSOCIATED WITH VARIOUS SATELLITE POSITIONING SYSTEMS IN WIRELESS COMMUNICATION NETWORKS

RELATED APPLICATION

This patent application claims benefit of and priority to U.S. Provisional Patent Application 61/082,112, filed Jul. 18, 2008, and titled "GNSS Sensitivity Assistance", and which is incorporated in its entirety by reference herein.

BACKGROUND

1. Field

The subject matter disclosed herein relates to wireless communication networks and devices and more particularly to methods and apparatuses for use by devices within a wireless communication network to request and/or provide sensitivity assistance information associated with various Satellite Positioning Systems (SPSs).

2. Information

Position determination processes may be used to estimate or otherwise determine a location of a device associated with a wireless communication network. In a particular example, a position determination process may be implemented to estimate location coordinates for a mobile device such as a cellular telephone or other like mobile station. There are a variety of techniques available to support position determination processes. For example, a Satellite Positioning System (SPS) such as the Global Positioning System (GPS) and/or other like systems may be used to estimate the location of a mobile station. In the context of a wireless communication network, certain position determination processes may require that information and/or processing tasks be shared and/or distributed between multiple devices. For example, in certain instances a mobile station may be assisted in some manner by one or more other devices as part of a position determination process. As a result, there is often a need for such devices to communicate in some manner, for example, via one or more position determination communication sessions over a wireless link. Thus, one or more positioning protocols may be developed to enable such position determination communication sessions and as such support position determination processes.

SUMMARY

Methods and apparatuses are provided for use by device(s) within in wireless communication network to share (e.g., request and/or provide) sensitivity assistance information signals associated with one or more Satellite Positioning Systems (SPSs).

In accordance with certain aspects, for example, a method may be implemented in a wireless communication network. The method may include sending one or more format modified Global Navigation Satellite System (GNSS) sensitivity assistance (SA) information signals, which are predicted, over a communication link from a location server operatively enabled to provide position location assistance to a mobile station. For example, format modified GNSS SA information signals may represent a portion of one or more corresponding native formatted GNSS SA information signals associated with a selected GNSS resource. Thus, in certain example implementations, native formatted GNSS SA information signals may include preamble information signals, encoded information signals (e.g., encoded using meander coding, Forward Error Correction (FEC) coding, convolutional coding, and/or the like), and/or time mark information signals, which may not be included or which may be modified in some manner in the format modified GNSS SA information signals. As used herein, it should be understood that the GNSS SA information signals, regardless of formatting, include predicted GNSS data rather than actual transmitted GNSS data. As discussed in greater detail in subsequent sections, such predicted GNSS data may be used by a device, such as a mobile station, to possibly improve performance when actual GNSS data is transmitted. For example, such predicted GNSS data may be employed in a GNSS receiver to wipe-off the navigation data modulated onto a GNSS spreading signal. In this manner, GNSS receivers may extend coherent integration beyond the duration of a transmitted data symbol of the GNSS signal, which may improve receiver sensitivity.

In accordance with certain other aspects, for example, a method may be provided for use in a mobile station. Here, the method may include receiving one or more format modified GNSS SA information signals over a communication link from a location server operatively enabled to provide position location assistance to the mobile station. In certain implementations, the method may also include establishing one or more native formatted GNSS SA information signals corresponding to the received one or more format modified GNSS SA information signals, based at least in part, on at least a portion of the one or more native formatted GNSS SA information signals, at least one reference time signal, and/or at least a portion of the one or more format modified GNSS SA information signals.

In accordance with still other aspects, for example, a method may be provided for use in a mobile station. The method may include transmitting one or more signals representing at least one message over a communication link to a location server operatively enabled to provide position location assistance to the mobile station, the at least one message may include at least one format indicator selectively requesting one or more GNSS SA information signals in a native format or a modified format. The message may also include an indicator identifying a selected GNSS resource. For example, a GNSS resource may include at least one of a GPS resource, an SBAS resource, a QZSS resource, a GLONASS resource, a Galileo resource, a Compass/BeiDou resource, and/or the like. In certain implementations, for example, the GNSS resource may be associated with at least one of a GNSS signal, a GNSS signal band, a Satellite Positioning System (SPS) signal, and/or a satellite vehicle (SV).

In accordance with yet other aspects, for example, a location server apparatus for use in providing position location assistance to a mobile station within a wireless communication network may include a signal processor that is operatively enabled to establish one or more format modified GNSS SA information signals based at least in part on one or more received GNSS signals. The location server apparatus may also include a transmitter that is operatively enabled to send at least a portion of the one or more format modified GNSS SA information signals via at least one message to the mobile station. The location server apparatus may also include a receiver operatively enabled to receive at least one soliciting message sent by the mobile station. Here, for example, the soliciting message(s) may include request element signals identifying at least one of the one or more format modified GNSS SA information signals, and/or a selected GNSS resource.

In accordance with certain other aspects, for example, a specific apparatus may be provided for use in a mobile station that is operatively enabled to receive position location assistance within a wireless communication network. The specific apparatus may include a wireless communication network interface that is operatively enabled to receive at least one message from a location server, wherein the message(s) includes one or more format modified GNSS SA information signals. The specific apparatus may also include a SPS receiver that is operatively enabled to selectively acquire GNSS signals based at least in part on the one or more format modified GNSS SA information signals.

In accordance with another aspect, for example, a specific apparatus may be provided for use in a mobile station that is operatively enabled to receive position location assistance within a wireless communication network. Here, the specific apparatus may include a wireless communication network interface that is operatively enabled to transmit one or more signals representing at least one message over a communication link to a location server operatively enabled to provide position location assistance to the mobile station. The message(s) may include at least one format indicator selectively requesting one or more GNSS SA information signals in a native format or a modified format.

In accordance with still other exemplary aspects, an article of manufacture may be provided which includes a computer readable medium having computer implementable instructions stored thereon. The computer implementable instructions, if implemented by one or more processing units in a specific apparatus, may operatively enable the specific apparatus to establish one or more format modified GNSS SA information signals based, at least in part, on the one or more received GNSS signals, and initiate transmission of the one or more format modified GNSS SA information signals over a communication link to a mobile station, the one or more format modified GNSS SA information signals being transmitted via at least one message.

In accordance with still other exemplary aspects, an article of manufacture may be provided which includes a computer readable medium having computer implementable instructions stored thereon. The computer implementable instructions, if implemented by one or more processing units in a specific apparatus, may operatively enable the specific apparatus to access at least one message from a location server. The message(s) may include one or more format modified GNSS SA information signals, and provide at least a portion of the one or more GNSS SA information signals to a receiver operatively enabled to acquire at least one GNSS signal based at least in part on at least the portion of the one or more received GNSS SA information signals.

In accordance with certain other aspects, for example, an article of manufacture may be provided which includes a computer readable medium having computer implementable instructions stored thereon. The computer implementable instructions, if implemented by one or more processing units in a specific apparatus, may operatively enable the specific apparatus to initiate transmission of one or more signals representing at least one message over a communication link to a location server. The message(s) may include at least one format indicator selectively requesting one or more GNSS SA information signals in a native format or a modified format.

DETAILED DESCRIPTION

Figure 1:
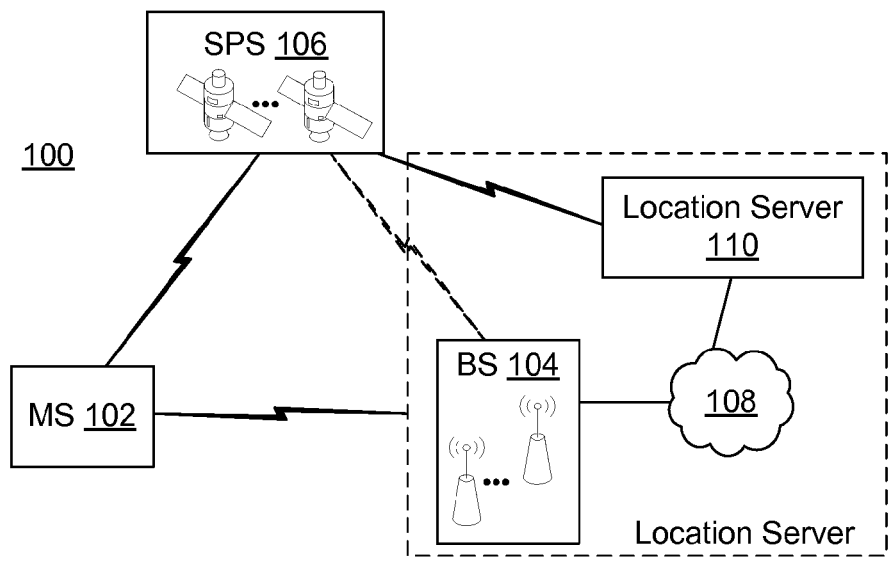
FIG. 1 is a schematic block diagram illustrating an example wireless communication network environment within which at least two devices may be enabled to communicate with one another and initiate and/or otherwise support a position determination process, in accordance with an implementation.

Non-limiting and non-exhaustive aspects are described with reference to the following figures, wherein like reference numerals refer to like parts throughout the various figures unless otherwise specified.

Position determination processes may be used to estimate or otherwise determine a location of a device and in particular examples the location of a mobile device such as a mobile station, Personal Navigation Device (PND) or tracking devices. There are a variety of techniques available to support position determination processes. In the context of a wireless communication network, certain position determination processes may require that information and/or processing tasks be distributed between and/or among multiple devices. For example, in certain instances a mobile device may be assisted in some manner by one or more other devices as part of a position determination process. As a result, there may be a need for such devices to communicate in some manner, for example, via one or more communication sessions, e.g., "position determination communication sessions" over a wireless link. One or more positioning protocols may be developed to enable such position determination communication sessions for supporting various position determination processes. Such positioning protocols may provide for sensitivity assistance (SA) information associated with one or more Satellite Positioning Systems (SPSs), to be requested by a mobile device and/or to be provided to the mobile device.

As described in greater detail in subsequent sections, in accordance with certain exemplary aspects, methods and apparatuses may be implemented in a location server that may be enabled to provide SA information to a mobile station, for example, as part of a position determination process.

Here, for example, a method may include sending one or more format modified Global Navigation Satellite System (GNSS) SA information signals over a communication link from a location server to a mobile station. The format modified GNSS SA information signals may, for example, be transmitted via at least one Position Determination Data Message (PDDM), Radio Resource LCS (Location Services) Protocol (RRLP) message (e.g., RRLP Measure Position Request, RRLP Assistance Data Delivery, etc.), Radio Resource Control (RRC) message (e.g., RRC Measurement Control, RRC Assistance Data Delivery, etc.), LTE Positioning Protocol (LPP) message, and/or other like message. By way of example but not limitation, certain PDDM messages are illustrated in the examples described herein.

In certain example implementations, format modified GNSS SA information signals may represent a portion of corresponding native formatted GNSS SA information signals associated with a selected GNSS resource. As such, when compared to the corresponding native formatted GNSS SA information signals, the format modified GNSS SA information signals may be more efficient to transmit, store, and/or process.

By way of example but not limitation, native formatted GNSS SA information signals may include preamble information signals, all or a portion of which may not be included in corresponding format modified GNSS SA information signals. In certain other examples, native formatted GNSS SA information signals may include encoded information signals (e.g., meander encoded information signals, FEC encoded information signals, convolutionally encoded information signals, Bose-Chaudhuri-Hocquenghem (BCH) encoded information signals, LDPC encoded information signals, Low Density Parity Check (LDPC) encoded information signals with interleaving, and/or the like), all or a portion of which may not be included in corresponding format modified GNSS SA information signals. In still other example implementations, native formatted GNSS SA information signals may include time mark information signals all or a portion of which may not be included in corresponding format modified GNSS SA information signals. Using meander encoding, for example, each data bit may have at least one transition that transitions at the middle of each bit period and may (depending on the information to be transmitted) include a transition at the start of the period as well. Here, for example, the direction of the mid-bit transition may indicate the data while transitions at period boundaries may be used to place the signal in a correct state to support the mid-bit transition. Meander encoding may include and/or otherwise be referred to as Manchester encoding or phase encoding, as non-limiting examples.

In certain implementations, a method may include establishing native formatted GNSS SA information signals, for example, based at least in part on previously received and/or estimated GNSS signals. In certain implementations, a method may include establishing format modified GNSS SA information signals, for example, based at least in part on received and/or estimated GNSS signals and/or established native formatted GNSS SA information signals.

In certain example implementations, a method may include having a location server or other like device send format modified GNSS SA information signals in a provide element of a PDDM. Here, for example, such a PDDM may be sent by the location server or other like device after being solicited by a mobile station. However, in certain implementations, such a PDDM may be sent 'unsolicited' by the location server or other like device to the mobile station. When solicited, certain example methods may therefore also include receiving at least one soliciting PDDM sent by a mobile station. A soliciting PDDM may include, for example, request element signals including an indicator signal identifying a desire by the mobile stations to receive either native or format modified GNSS SA information signals. A PDDM may include, for example, provide or request element signals including an indicator signal identifying a selected GNSS resource.

By way of example, a selected GNSS resource may be associated with at least one GNSS resource including at least one of a GPS resource, an SBAS resource, a QZSS resource, a GLONASS resource, a Galileo resource, a Compass/BeiDou resource, and/or the like. In certain example implementations, the GNSS resource may be associated with one or more specific GNSS signals and/or signal bands, one or more specific SPS signals, one or more SVs, and/or the like.

Also as described in greater detail in subsequent sections, in accordance with certain exemplary aspects, methods and apparatuses may be implemented in a mobile station that may be enabled to receive or otherwise take advantage of SA information from a location server, for example, as part of a position determination process.

For example, a method may be implemented which includes, with a mobile station, receiving one or more format modified GNSS SA information signals over a communication link from a location server, e.g., as transmitted via at least one PDDM. In certain implementations, a mobile station may be enabled to support a position determination process using format modified GNSS SA information signals, for example, at least a portion of the format modified GNSS SA information signals may be used by a SPS and/or GNSS receiver to assist in acquiring SPS and/or GNSS signals.

In other implementations, a mobile station may establish at least a portion of corresponding native formatted GNSS SA information signals. Thus, for example, a method may include establishing one or more native formatted GNSS SA information signals corresponding to one or more format modified GNSS SA information signals. Here, for example, a method may include establishing at least a portion of native formatted GNSS SA information signals corresponding to at least a portion of the received format modified GNSS SA information signals. In certain implementations, at least a portion of native formatted GNSS SA information signals may be based, at least in part, on at least one reference time signal, for example, if time mark information signals may not be included in the corresponding format modified GNSS SA information signals. In other examples, encoded portions of native formatted GNSS SA information signals may be established, should such not be included in the received format modified GNSS SA information signals.

A method may also include, for example, sending at least one soliciting PDDM to a location server requesting either native or format modified GNSS SA information signals.

In certain example implementations, an element within a PDDM may include a request element and/or a provide element that is compliant and/or otherwise operative with Telecommunications Industry Association (TIA) "IS-801-B" positioning protocol standard and/or an associated Third-Generation Partnership Project 2 (3GPP2) positioning protocol standard.

Positioning protocols have been developed and standardized for use in CDMA2000 and High Rate Packet Data (HRPD) wireless communication networks, for example. One example positioning protocol is often referred to by its standardization identity as "IS-801" in the TIA published standards (or "C.S0022" in 3GPP2 published standards). Currently, there are two versions of this example positioning protocol. The first version is the initial version IS-801 version 1 (or C.S0022-0 version 3.0), which will simply be referred to herein as IS-801-1. The second version is IS-801 version A (or C.S0022-A version 1.0), which will simply be referred to herein as IS-801-A.

There is some support for sharing native formatted GPS sensitivity assistance information in existing protocols, such as, IS-801-A. Given the increasing availability of other SPS (e.g., GNSS) it is in accordance with certain aspects of the present description, that it may be beneficial to develop more advanced/robust positioning protocol versions, such as, IS-801-B and/or other positioning protocol versions which may support a plurality of different GNSS and/or different types/formats of GNSS sensitivity assistance information. Moreover, it is also recognized that positioning protocol version negotiation processes may be employed within wireless networks, as needed, to allow various enabled devices to initiate and establish a position determination communication session over a communication channel/link and through which certain such potentially varying types of sensitivity assistance information may be requested and/or provided in an efficient manner.

By way of example but not limitation, certain methods and apparatuses provided herein may use one or more PDDMs which may be provided in one or more transport messages in a manner that not only supports IS-801-B, but also legacy and/or future versions. Further still, certain methods and apparatuses may be enabled to support position determination processes in a variety of wireless communication networks, such as, e.g., an Ultra Mobile Broadband (UMB) network, a High Rate Packet Data (HRPD) network, a CDMA2000 1X network, and/or the like.

In accordance with certain aspects of the present description various methods and apparatuses are provided which may be implemented in one or more devices that support a position determination process. By way of example but not limitation, a device may include a mobile station, or a specific apparatus, such as, a base station, a location server (e.g. a Position Determination Entity (PDE), Serving Mobile Location Center (SMLC), Gateway Mobile Location Center (GMLC), Standalone AGPS SMLC (SAS), SUPL Location Platform (SLP), etc.), and/or the like. For example, in certain implementations a mobile station and base station may be operatively enabled to communicate within a CDMA wireless communication network, and/or other applicable type of wireless communication network.

Methods and apparatuses may be implemented in such devices to allow the devices to utilize a position determination communication session associated with a position determination process. The position determination communication session may utilize a negotiated positioning protocol version, depending on the capabilities of the devices involved. Thus, the methods and apparatuses may be implemented to allow for different positioning protocol versions within a network. The methods and apparatuses may, for example, be enabled to allow for or otherwise support backward and/or forward compatibility between various positioning protocol versions within a network.

In the following detailed description, numerous specific details are set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the terms specific apparatus, special purpose computing device or platform, or the like include a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Attention is now drawn to FIG. 1, which is a schematic block diagram illustrating an example wireless communication network environment 100 within which devices may be enabled to communicate with one another and initiate and/or otherwise support a position determination process.

In this particular example, wireless communication network environment 100 includes representative devices such as a mobile station (MS) 102, one or more base station(s) (BS) 104, one or more Satellite Positioning System(s) (SPS) 106, a network 108, and a location server 110. MS 102 may be enabled to communicate with BS 104 over one or more wireless communication links. One or more of MS 102, BS 104, or location server 110 may be enabled to acquire SPS signals transmitted by various transmitting resources of SPS 106, and/or otherwise be enabled to support certain position determination processes associated with information available via SPS 106.

Although the representative devices in FIG. 1 are illustrated as being coupled by either wireless communication links or wired communication links it should be understood that in certain example implementations at least some of the devices may be coupled together via one or more wired, fiber, and/or wireless communication link(s).

Unless specifically stated otherwise, as used herein, the term "location server" is intended to represent one or more devices and/or one or more specific apparatuses therein that is/are enabled to support, at least in part, such position determination processes. Thus, while illustrated as a separate device in the example shown in FIG. 1 that may communicate via network 108 and/or a BS 104 with MS 102, it should be understood that in other implementations a "location server" may be enabled to communicate directly and/or indirectly with MS 102 using one or more wired and/or one or more wireless communication links. Hence, in certain example implementations, a location server may take the form of and/or otherwise operatively comprise one or more wireless transmitters, receivers, transceivers, one or more base stations, various wired and/or wireless network resources, one or more computing devices enabled as specific apparatuses, and/or other like computing and/or communication devices. With this in mind, where example references are made to a base station (BS) or a BS 104, it should be understood that such BS and/or BS 104 may comprise a "location server" as broadly defined herein. Accordingly, the terms base station (BS) and location server are used interchangeably. Further still, in messages requesting and/or providing BS capabilities, etc., it should be understood that such requested information and/or provided information may be associated with location server capabilities, etc.

MS 102 and/or BS 104 may be enabled to provide functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. As mentioned earlier, the techniques may be implemented for use with a UMB network, a HRPD network, a CDMA2000 1X network, GSM, 3GPP Long Term Evolution (LTE), and/or the like. The wireless communication networks may include, for example, wireless access points and femtocells.

SPS 106 may, for example, include one or more of the Global Positioning System (GPS), a modernized GPS, Galileo, GLONASS, a Satellite Based Augmentation System (SBAS), Quasi-Zenith Satellite System (QZSS), Indian Regional Navigational Satellite System (IRNSS), Compass/BeiDou, NAVSTAR, and/or other like GNSS, a system that uses satellites from a combination of these systems, or any SPS developed in the future, each referred to generally herein as a "Satellite Positioning System" (SPS).

Furthermore, the methods and apparatuses described herein may be used with position determination processes that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be used to augment an SPS, for example, in situations where some SPS signals from orbiting satellites might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

MS 102, in certain example implementations, may include a device such as a cellular or other wireless communication device, personal communication system (PCS) device, personal navigation device, a vehicle mountable navigation device, a tracking device, Personal Information Manager (PIM), Personal Digital Assistant (PDA), laptop or other suitable device which may be capable of receiving wireless communications.

The methodologies described herein may be implemented by various means depending upon the application. For example, these methodologies may be implemented in various combinations of hardware, firmware, and/or software. For a hardware implementation, one or more processing units may be implemented within one or more application specific integrated circuits (ASICs), signal processors/digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, certain methodologies may be implemented with modules (e.g., procedures, functions, and so on) that perform the functions described herein. Any machine readable medium tangibly embodying instructions may be used in implementing the methodologies described herein. For example, software code may be stored in a memory of MS 102 and/or BS 104 and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware/software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Instructions/code as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Figure 2:
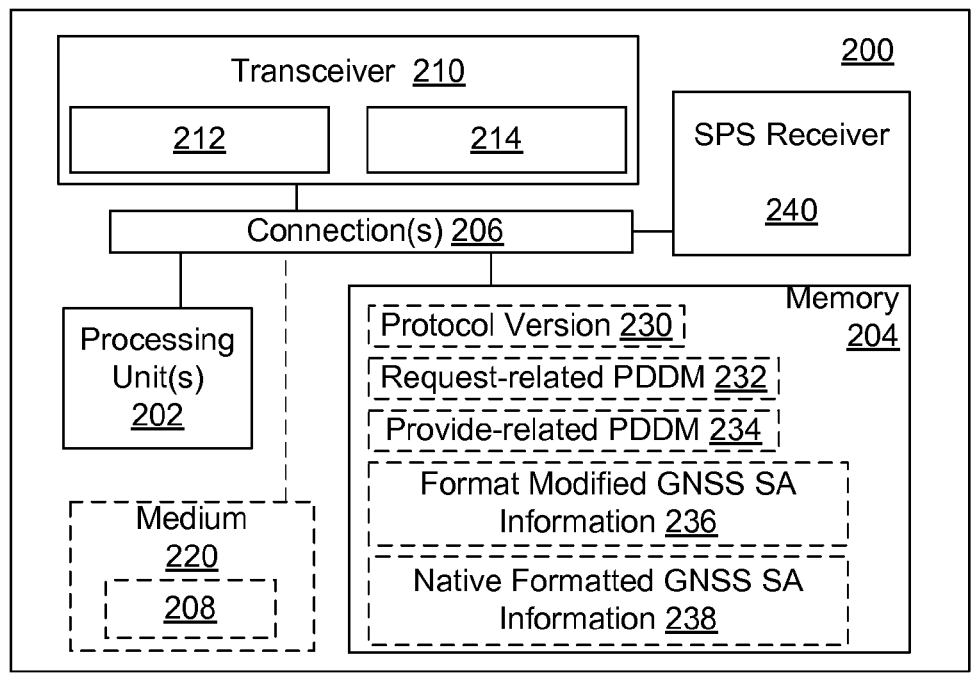
FIG. 2 is a schematic block diagram illustrating certain example features of a device that may be enabled to initiate and/or otherwise support a position determination process, in accordance with an implementation.

Reference is now made to FIG. 2, which is a schematic block diagram illustrating certain example features of a specific apparatus 200 enabled to initiate and/or otherwise support a position determination process. Apparatus 200 may, for example, be implemented in some form within MS 102, BS 104, location server 110, and/or other like devices, as applicable, to perform or otherwise support at least a portion of the example techniques described herein.

Apparatus 200 may, for example, include one or more processing units 202, memory 204, a transceiver 210 (e.g., wireless network interface), and (as applicable) an SPS receiver 240, which may be operatively coupled with one or more connections 206 (e.g., buses, lines, fibers, links, etc.). In certain example implementations, all or part of apparatus 200 may take the form of a chipset, and/or the like.

Processing unit 202 may be implemented using a combination of hardware and software. Thus, for example, processing unit 202 may represent one or more circuits configurable to perform at least a portion of a data signal computing procedure or process related to the operation of device 200. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 204 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 220. As such, in certain example implementations, the methods and/or apparatuses presented herein may take the form in whole or part of a computer readable medium 220 that may include computer implementable instructions 208 stored thereon, which if executed by at least one processing unit 202 may be operatively enabled to perform all or portions of the example operations as described herein. Computer readable medium 220 may be a part of memory 204.

As illustrated in FIG. 2, memory 204 may also include instructions and/or information in the form of data signals associated with at least one positioning protocol version 230, a request-related PDDM 232, a provide-related PDDM 234, format modified GNSS SA information 236, and (optionally) native GNSS SA information 238.

Thus, for example, if apparatus 200 is implemented in location server 110 (FIG. 1), then all or portions of the GNSS SA information may also be estimated and/or otherwise derived based, at least in part, on SPS signals received via SPS receiver 240. Apparatus 200 may be enabled to format at least a portion of the GNSS SA information in a native format, for example, having navigation information signals formatted to match that which a GNSS resource transmits. Apparatus 200 may be enabled to format at least a portion of the GNSS SA information in a modified format, for example, having navigation information signals and/or other information signals formatted to not match that which a GNSS resource transmits. Further, in certain implementations as illustrated in greater detail below, format modified GNSS SA information signals may not include certain portions of information signals that are part of corresponding native formatted GNSS SA information signals. Thus, apparatus 200 may be enabled to establish GNSS SA information signals in various formats and/or with/without certain selected information signals. Here, for example, apparatus 200 may send such selectively formatted GNSS SA information signals to a mobile station using one or more PDDM(s).

If apparatus 200 is implemented in MS 102 (FIG. 1), for example, then SPS receiver 240 may be enabled to receive signals associated with one or more SPS resources, and more particularly to acquire certain GNSS signals based, at least in part, on GNSS SA information signals as received from a location server. In certain implementations, for example, SPS receiver 240 and/or processing unit 202 may be enabled to use at least a portion of GNSS SA information signals, however formatted (e.g., native or modified formats), without significant additional processing. In other implementations, for example, SPS receiver 240 and/or processing unit 202 may be enabled to process at least a portion of format modified GNSS SA information signals in some manner prior to use. For example, apparatus 200 may be enabled to establish corresponding native formatted GNSS SA information signals based, at least in part, on received format modified GNSS SA information signals. Conversely, for example, apparatus 200 may be enabled to establish corresponding format modified GNSS SA information signals based, at least in part, on received native formatted GNSS SA information signals.

Transceiver 210 may, for example, include a transmitter 212 enabled to transmit one or more signals over one or more wireless communication links and a receiver 214 to receive one or more signals transmitted over one or more wireless communication links. In certain implementations, transceiver 210 may also support wired transmission and/or reception, e.g., when implemented within BS 104, location server 110, and/or other like devices.

Figure 3:
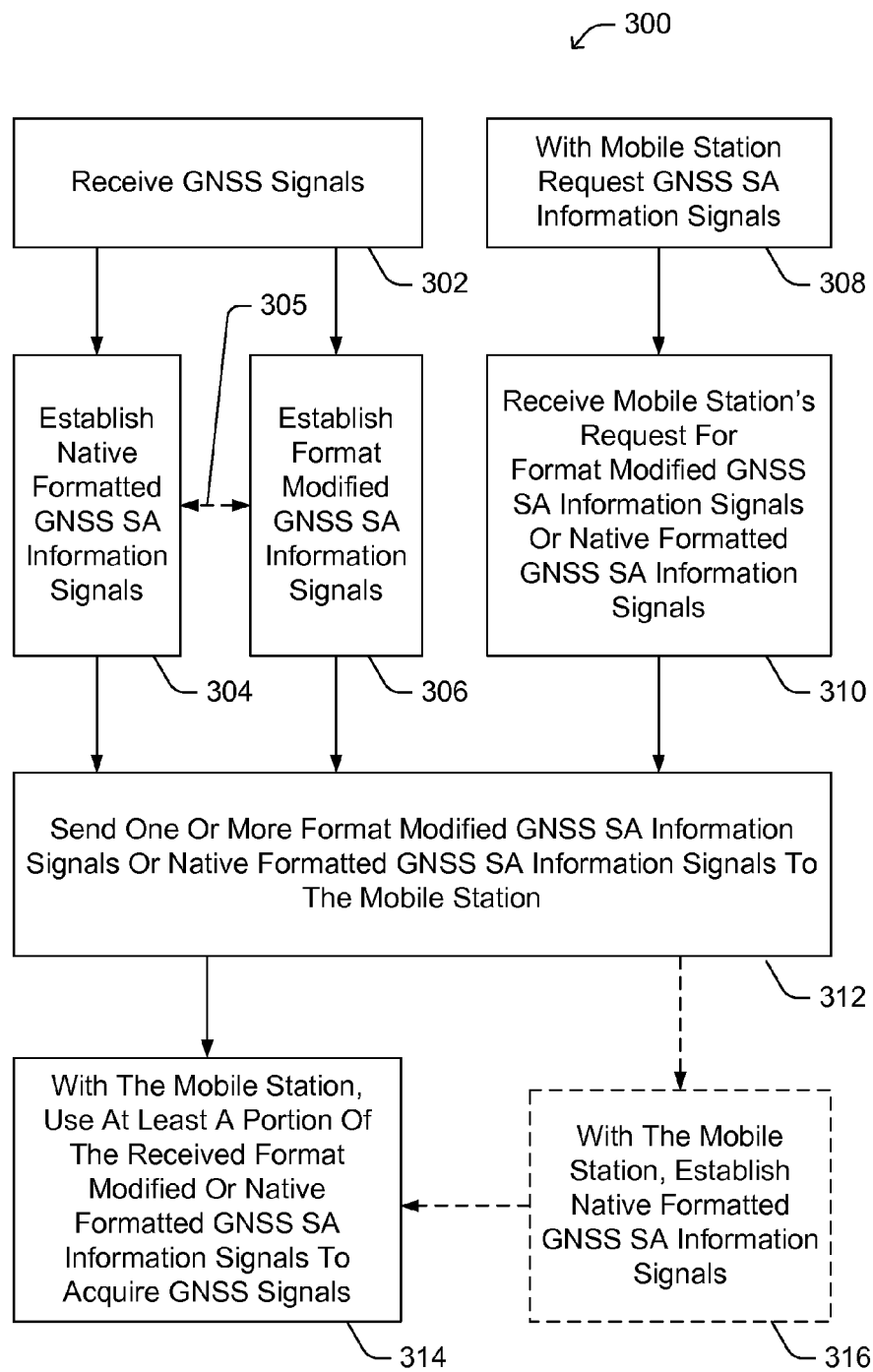
FIG. 3 is a flow-diagram illustrating an exemplary method that may be implemented in one or more devices to initiate and/or otherwise support a position determination process, in accordance with an implementation.

Attention is drawn next to FIG. 3, which is a flow-diagram 300 illustrating exemplary methods that may be implemented in wireless communication network environment 100 to support a position determination process and more particularly, to support devices in requesting and providing GNSS SA information signals.

At block 302, a location server and/or other like device may receive SPS (e.g., GNSS) signals. Here, for example, as is well known GNSS signals may include navigation information signals and other information signals as transmitted by an SPS in a native format.

At block 304, a location server and/or other like device may (as applicable) establish (e.g., predict) native formatted GNSS SA information signals, for example, based at least in part on the received GNSS signals. The established native formatted GNSS SA information signals may, for example, include at least in part navigation information signals in a native format as might be expected to be received by the location server and/or mobile station at some point in the future. Techniques for predicting such GNSS SA information signals are well known. For example, it is known to predict GPS SA information signals and provide such to a mobile station which may then use such information signals to acquire actual GPS signal(s), e.g., employing modulation wipe-off techniques which may significantly increase the sensitivity of an SPS/GNSS receiver.

At block 306, a location server and/or other like device may (as applicable) establish format modified GNSS SA information signals, for example, based at least in part on the received GNSS signals. As illustrated by dashed line arrow 305, in certain example implementations, all or portions of established native formatted GNSS SA information signals (e.g., as established at block 304) may be accessed and processed in some manner (e.g., re-formatted, decoded, encoded, etc.) to establish corresponding format modified GNSS SA information signals; and/or in opposite fashion, all or portions of established format modified GNSS SA information signals (e.g., as established at block 306) may be accessed and processed in some manner (e.g., re-formatted, decoded, encoded, etc.) to establish corresponding native formatted GNSS SA information signals (e.g., at block 304).

By way of example but not limitation, in certain implementations one or more native formatted GNSS SA information signals may include preamble information signals, while one or more corresponding format modified GNSS SA information signals may not include such preamble information signals. In certain implementations one or more native formatted GNSS SA information signals may include encoded information signals, while one or more corresponding format modified GNSS SA information signals may not include such encoded information signals. In some example implementations one or more native formatted GNSS SA information signals may include time mark information signals, while one or more corresponding format modified GNSS SA information signals may not include such time mark information signals. In certain example implementations, such time mark information may also include and/or otherwise take the form of other preamble bits/symbols, synchronization symbols/bits, and/or the like.

At block 308, a mobile station may send one or more messages (e.g., PDDMs) requesting certain GNSS SA information signals from a location server and/or other like device. The one or more messages may, for example, include one or more request element signals. The one or more request element signals may include, for example, one or more format indicator signals identifying that one or more modified or native formatted GNSS SA information signals are requested. In certain example implementations, request element signals may include indicator signals identifying that the requested GNSS SA information signals are to be associated with one or more selected GNSS resources. By way of example but not limitation, the one or more modified or native formatted GNSS SA information signals may be associated with at least one GNSS resource, such as, a GPS resource, an SBAS resource, a QZSS resource, a GLONASS resource, a Galileo resource, a Compass/BeiDou resource, and/or other like SPS/GNSS resources. In certain example implementations, a specific GNSS signal, GNSS signal band, SPS signal, SV, and/or the like, may be identified using one or more indicator signals.

At block 310, a location server and/or other like device may receive the mobile station's request for format modified or native formatted GNSS SA information signals.

At block 312, a location server may send one or more modified or native formatted GNSS SA information signals to the mobile station. In certain example implementations, a location server may send one or more modified or native formatted GNSS SA information signals to the mobile station in a solicited PDDM having a provide element. Here, for example, a solicited PDDM may be sent to the mobile station in response to receiving a request at block 310. In certain other example implementations, a location server may send one or more modified or native formatted GNSS SA information signals to the mobile station in an unsolicited or subsequent PDDM.

At block 314, a mobile station may use at least a portion of the received format modified or native formatted GNSS SA information signals to assist in acquiring certain GNSS signals. For example, as mentioned and as is known, at least a portion of GNSS navigation information signals within the GNSS SA information signals may be used for modulation wipe-off in receiving and acquiring GNSS signals. Such modulation wipe-off capability may, for example, allow for the mobile station to experience quicker signal acquisition, acquire weaker signals, and/or acquire signals in a noisy/limited environment.

At block 316, if a mobile station receives format modified GNSS SA information signals, then the mobile station may establish native formatted GNSS SA information signals based, at least in part, on the format modified GNSS SA information signals. The established native formatted GNSS SA information signals may then be used at block 314. For example, certain format modified GNSS SA information signals may reduce the attendant communication and/or processing capabilities that may apply to communicating corresponding native formatted GNSS SA information signals to a mobile station. In certain implementations the SPS receiver and/or processing unit(s) in the mobile station may be enabled to use format modified GNSS SA information signals directly and thus block 316 may not be applicable.

Attention is drawn next to Table 1 (below), which illustrates certain exemplary information that may be included in one or more PDDM(s) to request GNSS SA information signals.

TABLE 1

| Information Element Name | Type | Multi | Presence |
|---|---|---|---|
| Time of sensitivity assistance | Integer (e.g., 0 ... 86399) | | |
| Time reference source | Integer (e.g., 0 ... 15) | | Optional |
| GNSS information request | | (e.g., 1 to <maxNUM_GNSS>) | |
| >GNSS identifier | Integer (e.g., 1 ... 16) | | |
| >Request GNSS signal data record | | (e.g., 1 to <maxNUM_SIG>) | Optional |
| >>GNSS signal identifier | Integer (e.g., 1 ... 8) | | Optional |

TABLE 1-continued

| Information Element Name | Type | Multi | Presence |
|---|---|---|---|
| >>CHOICE SV information | | | Optional |
| >>>Sensitivity assistance for all satellites | Null | | |
| >>>Sensitivity assistance for specified satellites | | | |
| >>>>Satellite bit mask | Bit String (e.g., 1 ... 64) | | |
| >>Requested data record size | Integer (e.g., 1 ... 2048) | | Optional |
| >>Requested Nav bits encoding indicator | Boolean | | |

As illustrated in Table 1, in accordance with certain example implementations, an element may include a time of sensitivity assistance (ToSA) value that specify a time of day (e.g., in seconds) based on a time reference specified by a "time reference source" for which the sensitivity assistance request is applicable. Here, for example, a mobile station may set this value to represent a time of a "reference bit", wherein the reference bit may be the last bit of the first half of an over-the-air navigation data message bits/symbols included in the corresponding response element.

As illustrated in Table 1, a time reference source element may be provided for a mobile station to indicate the type of time reference used for the ToSA. By way of example, in certain implementations, a '0' value may indicate a CDMA time reference, a '1' value may indicate a GPS time reference, a '2' value may indicate a QZSS time reference, a '3' value may indicate a GLONASS time reference, a '4' value may indicate a Galileo time reference, a '5' value may indicate a Compass/BeiDou time reference, etc. In certain implementations, the time reference source value may be optional, for example, if absent then the "time reference source" may be considered to be a CDMA time reference.

As illustrated in Table 1, a GNSS information request element may be included and used to identify a GNSS for which GNSS SA information signals are requested. By way of example, Table 2 (below) illustrates some exemplary GNSS identifier values which map to selected example GNSS. In this example, a value of '1' maps to GPS, a value of '2' maps to SBAS, a value of '3' maps to QZSS, a value of '4' maps to GLONASS, a value of '5' maps to Galileo, a value of '6' maps to Compass/BeiDou, and values '7' through '16' may map to other GNSS.

In certain implementations, a GNSS signal identifier element may be included and used to identify a GNSS signal for a GNSS as identified by "GNSS identifier" for which SA information signals are requested. An exemplary mapping of GNSS signal identifier to some example GNSS signals is shown in Table 2. This element may be optional in certain implementation; thus, e.g., if absent a location server or other like device may be enabled to select a GNSS signal corresponding to the integer value '1', for example, in accordance with Table 2.

In accordance with Table 1, a Choice SV information element may be included. Here, for example, if the location server or other like device is to use the same SV information as in a previous "GNSS information request" element, the mobile station may omit this field; otherwise the mobile station may include a value for this element.

As presented in Table 1, an SA for all satellites element may be included, such that, e.g., if this choice is present, a location server or other like device may include GNSS SA information signals for all satellites of a constellation identified by the GNSS identifier.

As shown in Table 1, an SA for specified satellites element may be included, such that, e.g., if this choice is present, a location server or other like device may include GNSS SA information signals for those satellites identified by a "Satellite bit mask" for a constellation identified by "GNSS identifier". By way of example, a mobile station may set certain bits in a Satellite bit mask as illustrated in Table 3 (below). In certain implementations, such element may be of variable length.

TABLE 2

| | | GNSS signal identifier; integer value | | | | | | | |
|---|---|---|---|---|---|---|---|---|---|
| | | '1' | '2' | '3' | '4' | '5' | '6' | '7' | '8' |
| GNSS | | GNSS signal identifier; bit string value | | | | | | | |
| identifier value | GNSS | Bit 1 (LSB) | Bit 2 | Bit 3 | Bit 4 | Bit 5 | Bit 6 | Bit 7 | Bit 8 (MSB) |
| '1' | GPS | L1 C/A | L1C | L2C | L5 | — | — | — | — |
| '2' | SBAS | L1 C/A | — | — | — | — | — | — | — |
| '3' | QZSS | L1 C/A | L1C | L2C | L5 | — | — | — | — |
| '4' | GLONASS | G1 | G2 | G3 | — | — | — | — | — |
| '5' | Galileo | E1 | E5a | E5b | E5a + E5b | E6 | — | — | — |
| '6' to '16' | Reserved for future GNSS | — | — | — | — | — | — | — | — |

TABLE 3

| GNSS identifier value | GNSS | GNSS satellite ID number value | Interpretation of GNSS satellite ID number |
|---|---|---|---|
| '1' | GPS | '0'-'62' | Satellite PRN Signal No. 1 to 63. |
| | | '63' | Reserved. |
| '2' | SBAS | '0'-'38' | Satellite PRN Signal No. 120 to 158. |
| | | '39'-'63' | Reserved. |
| '3' | QZSS | '0'-'4' | Satellite PRN Signal No. 193-197. |
| | | '5'-'63' | Reserved. |
| '4' | GLONASS | '0'-'23' | Slot Number 1 to 24. |
| | | '24'-'63' | Reserved. |
| '5' | Galileo | Not Specified | Not Specified |

TABLE 3-continued

| GNSS identifier value | GNSS | GNSS satellite ID number value | Interpretation of GNSS satellite ID number |
|---|---|---|---|
| '6' | Compass/ BeiDou | Not Specified | Not Specified |
| '7' to '16' | Reserved for future GNSS | — | — |

As further illustrated in Table 1, a Requested data record size element may be included such that, for example, if this is the first Requested data record size listed in this "GNSS information request" element, a mobile station may include this element; otherwise, the mobile station may set this element as follows. If the location server is to use the same Requested data record size as in a previous "GNSS information request" element, the mobile station may omit this element; otherwise the mobile station may include this element and set it to a requested minimum size of a sensitivity assistance data record that the location server is to include in the corresponding response (provide) element.

Also as illustrated in Table 1, a Requested Navigation bits encoding indicator or other like element may be included to indicate whether native formatting or modified formatting of the GNSS SA information signals is being requested. For example, in certain implementations, a mobile station may set this field to TRUE ('1') if a native format is requested and to FALSE ('0') if a modified format is requested. Thus, for example, in certain implementations native formatted GNSS SA information signals may include GNSS SA navigation message symbols in a native over-the-air format, and format modified GNSS SA information signals may include non-channel-encoded navigation data bits, e.g., without preamble bits, or synchronization bits, or without meander, convolutional or other encoding, and/or without time mark bits, as might be included (as applicable) in corresponding native formatted GNSS SA information signals.

Table 4 (below) shows certain exemplary information that may be included in one or more provide sensitivity assistance information message(s) as part of a position determination process, in accordance with an implementation.

TABLE 4

| Information Element Name | Type | Multi | Presence |
|---|---|---|---|
| Part number | Integer (e.g., 1 . . . 64) | | |
| Total number of parts | Integer (e.g., 1 . . . 64) | | |
| Time of sensitivity assistance | Integer (e.g., 0 . . . 2999) | | |
| Time reference source | Integer (e.g., 0 . . . 15) | | Optional |
| GNSS SA data record | | (e.g., 1 to <maxNUM_GNSS>) | |
| >GNSS identifier | Integer (e.g., 1 . . . 16) | | |
| >Request GNSS signal data record | | (e.g., 1 to <maxNUM_SIG>) | |
| >>GNSS signal identifier | Integer (e.g., 1 . . . 8) | | Optional |
| >>Nav bits encoding indicator | Boolean | | |
| >>Nav message bits | Bit String (e.g., 4 . . . 8192) | | |
| >>SV ID information | | (e.g., 1 to <maxNUM_SV>) | |
| >>>GNSS satellite ID number | Integer (e.g., 0 . . . 63) | | |

As shown in Table 4, for example, a Part number element may be included with which a location sever or other like device may specify a part number of a GNSS Sensitivity Assistance data, and a Total number of parts element may be included with which the location server or other like device may specify a total number of parts that the GNSS Sensitivity Assistance data is divided into.

In accordance with the example shown in Table 4, a ToSA element and a Time reference source element may be included. Further, as illustrated in Table 4, a GNSS SA data record may be included using, for example, a GNSS identifier element and a Request GNSS signal data record element. The Request GNSS signal data record element may include a GNSS signal identifier element, and a Navigation bits encoding indicator element, as applicable. Additionally, a Request GNSS signal data record element may also include GNSS SA information signals (e.g., here, Navigation message bits) in native or modified format. Additionally, SV ID information and/or GNSS satellite ID number information elements may be included.

Thus, using request and provide elements in PDDMs, a mobile station and location server may be enabled to support assisted position determination processes using GNSS SA information signals. In certain examples, for example in an IS-801-B compliant wireless network, a location server may provide (solicited or unsolicited) a "Provide GNSS Sensitivity Assistance" response element in one or more response PDDMs, e.g., according to the number of parts into which the response element may be divided. In certain implementations, a location server may set a 'Total number of parts' element to identical values in all parts of the same "Provide GNSS Sensitivity Assistance" message. A location server may set a "Time of sensitivity assistance" to a time of a last bit of a first half of a native over-the-air navigation message bits derived from the "Nav message bits" in the response element.

The location server may provide GNSS SA information signals per a requested "GNSS identifier" and/or a "GNSS signal identifier" that may be included in a "Request GNSS Sensitivity Assistance" request element sent by a mobile station. If either the "Request GNSS Signal Data Record" is not included, or if the "Request GNSS Signal Data Record" is included and "GNSS signal identifier" is not included, the location server may provide GNSS sensitivity assistance per requested "GNSS identifier" and "GNSS signal identifier"='1'.

If the "SV information" element is not included in the "GNSS information request" element, the location server may use the same "SV information" as included in a previous "GNSS information request" element included in the same "Request GNSS Sensitivity Assistance" request element.

If the "Requested data record size" is not included in the "GNSS information request" element, the location server may use the same "Requested data record size" as included in the previous "GNSS information request" element included in the same "Request GNSS Sensitivity Assistance" request element.

If the "Requested data record size" is included, the location server may set a length of the "Nav message bits" to greater or equal to the value of the "Requested data record size" element included in the "Request GNSS Sensitivity Assistance" request element.

If a "Requested Nav Bits encoding indicator" is set to TRUE ('1'), the location server may include GNSS SA information signals (e.g., SA navigation message symbols) in a native over-the-air format. If a "Requested Nav Bits encoding indicator" is set to FALSE ('0'), the location server may include GNSS SA information signals (e.g., SA navigation message bits) in a non-channel encoded format, for example, without preamble bits and without meander, convolutional or other encoding, if any, and/or without time mark information signals.

Figure 4:
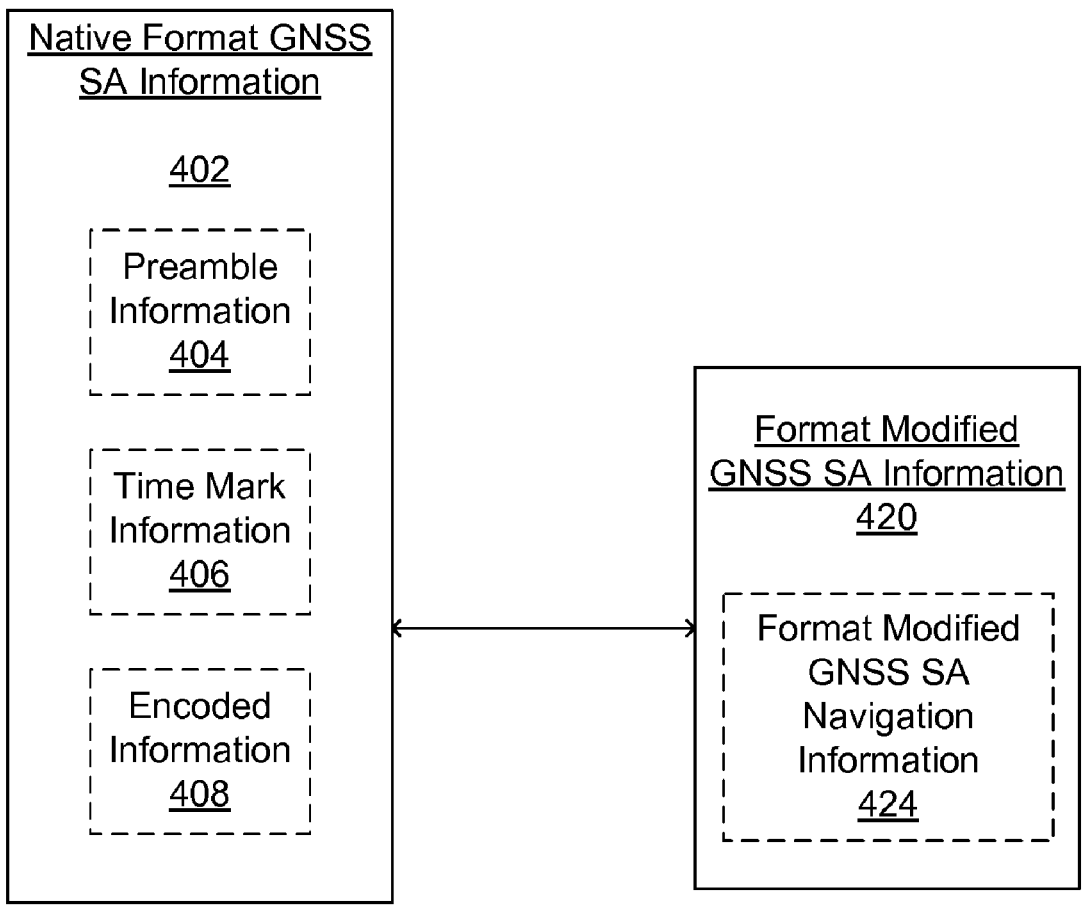
FIG. 4 is an illustrative block diagram depicting sensitivity assistance information in native and modified formats, in accordance with an implementation.

Reference is made next to FIG. 4, which illustrates that native formatted GNSS SA information signals 402, may include, for example, one or more of: preamble information signals 404, time mark information signals 406, and/or encoded information signals 408. Corresponding format modified GNSS SA information signals 420, may not include, for example, one or more of: preamble information signals 404, time mark information signals 406, and/or encoded information signals 408, but may include format modified GNSS SA navigation information signals 424.

Figure 5:
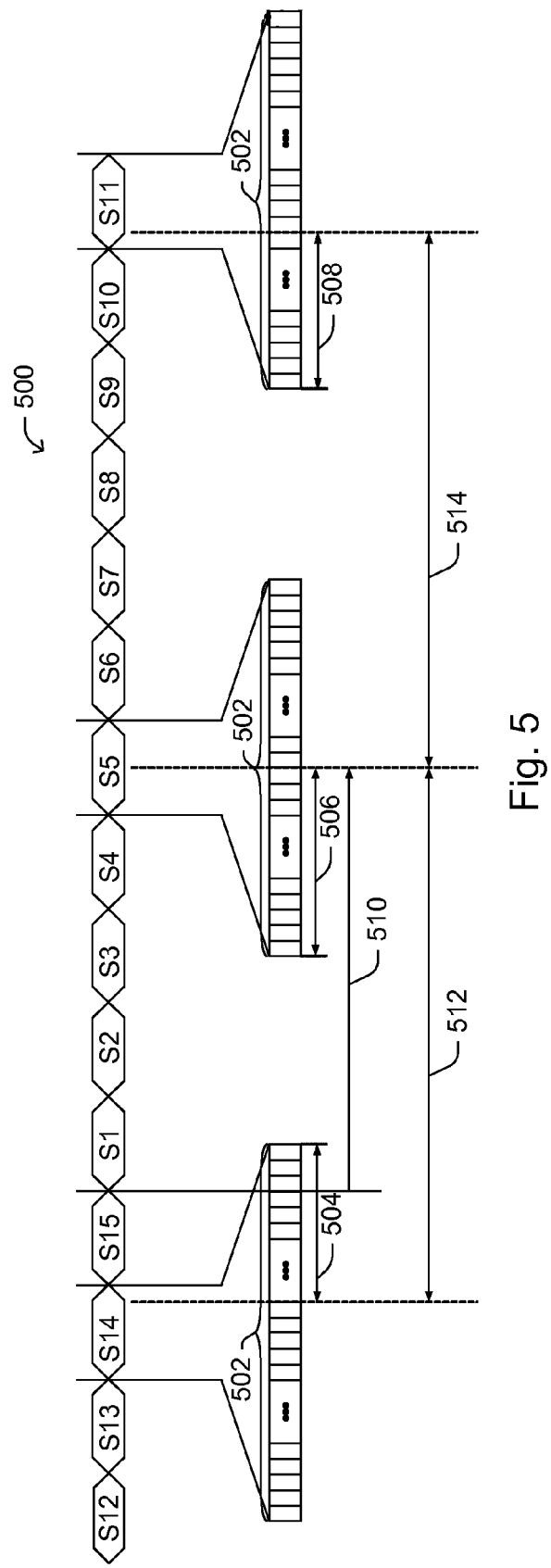
FIG. 5 is an illustrative block diagram depicting portions of sensitivity assistance information signals in an example native format, in accordance with an implementation.

Attention is drawn next to FIG. 5, which illustrates example native formatted GNSS SA information signals 500 associated with, for example, GLONASS and represented by strings (S1 through S15), with strings S14, S5 and S11 expanded to illustrate a length 502=200 symbols. Also shown are span 504=78 symbols, span 506=102 symbols, span 508=82 symbols, reference time 510=9.02 seconds (e.g., 451 in 20 ms units), navigation bits portions 512 and 514 each relating to 1180 symbols. Here, the SA information signals may include native bits across multiple strings, and the symbol counts include meander encoded data bits and time marks in the strings.

Figure 6:
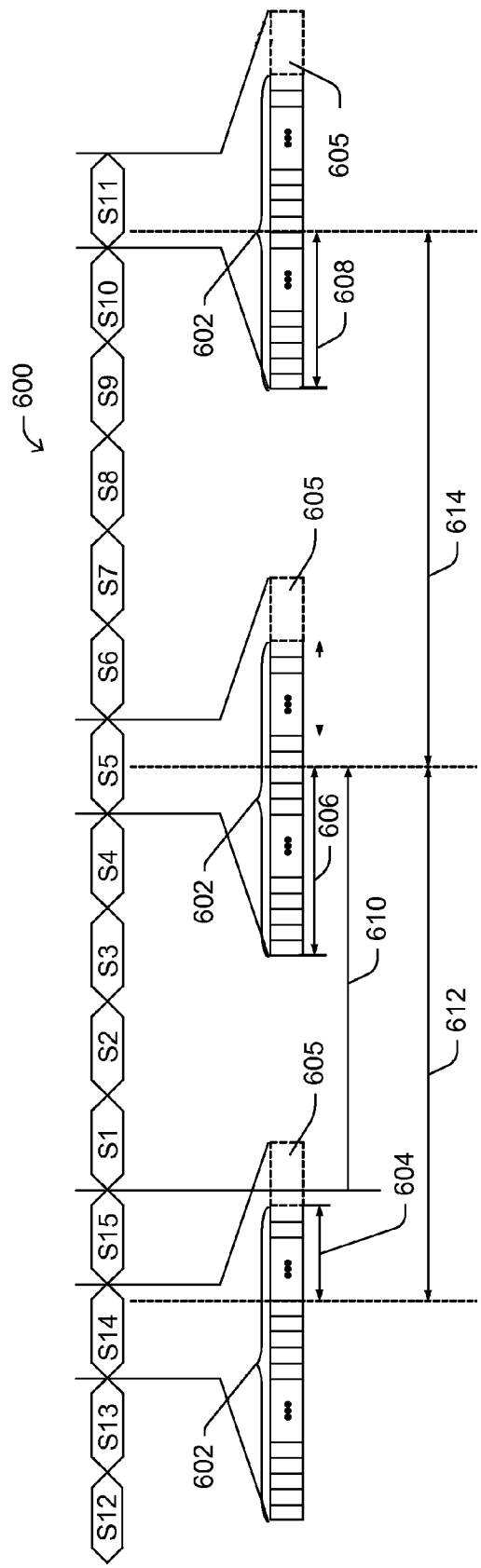
FIGS. 6 and 7 are illustrative block diagrams depicting portions of sensitivity assistance information signals in example modified formats, in accordance with certain implementations.

Attention is drawn next to FIG. 6, which illustrates example format modified GNSS (here, GLONASS) SA information signals 600 represented by strings (S1 through S15), with strings S14, S5 and S11 expanded to illustrate a length 602=170 symbols. Also shown are span 604=48 symbols, span 606=102 symbols, span 608=82 symbols, reference time 610=9.02 seconds (e.g., 451 in 20 ms units), navigation bit portions 612 and 614 each relating to 1000 symbols.

Here, for example, the SA information signals may include differentially encoded symbols across multiple strings. In this example, navigation bit portions 612 and 614 may include navigation information bits with hamming code and meander encoding, but not time mark 605. By way of example but not limitation, a process for reconstruction of corresponding native formatted GNSS navigation bits (e.g., by a mobile station) may include adding thirty (30) time mark symbols at the end of the following 10 ms symbols:

$$2*((1000-102) \bmod (170)), 2*((1000-102) \bmod (170))+ 170, 2*((1000-102) \bmod (170))+2*170, \ldots, 2*((1000-102) \bmod (170))+11*170.$$

Figure 7:
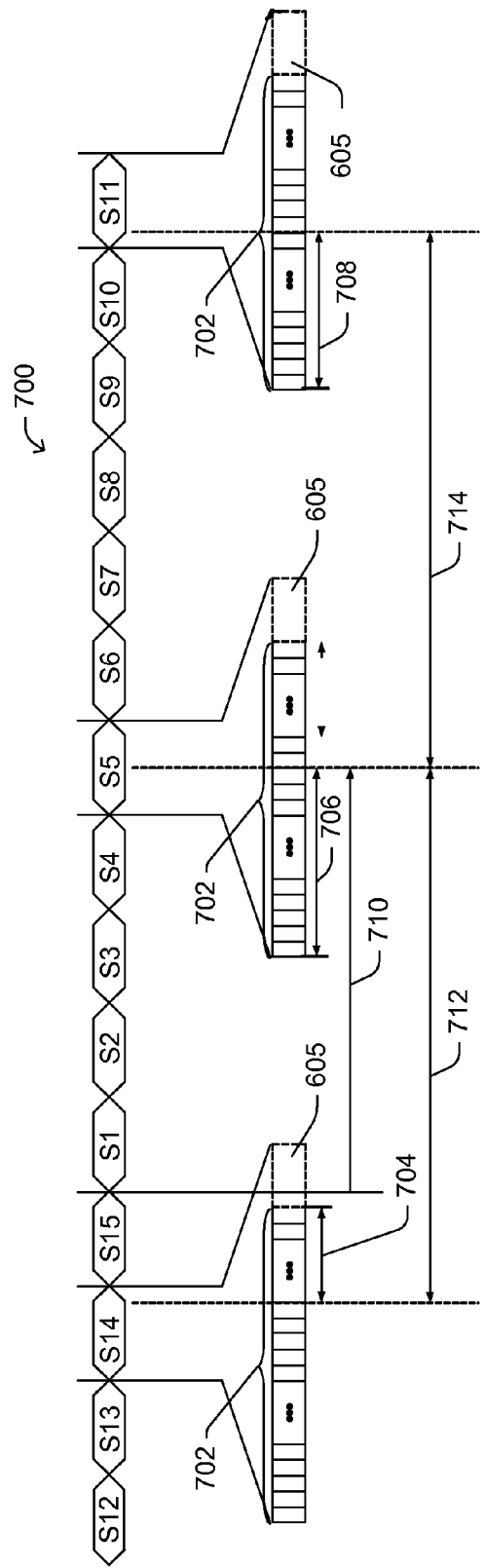

Attention is drawn next to FIG. 7, which illustrates other example format modified GNSS (here, GLONASS) SA information signals 700 represented by strings (S1 through S15), with strings S14, S5 and S11 expanded to illustrate a length 702=77 bits of data plus 8 bits of Hamming code. Also shown are span 704=24 bits, span 706=51 symbols, span 708=41 bits, reference time 710=9.02 seconds (e.g., 451 in 20 ms units), navigation bit portions 712 and 714 each relating to 500 symbols.

Here, for example, navigation bit portions 712 and 714 may include differentially encoded bits across multiple strings, counting only the 50 Hz information bits with hamming code, but without meander encoding and time mark 605 in a string. By way of example but not limitation, process for reconstruction of corresponding native formatted GNSS navigation bits (e.g., by a mobile station) may include adding meander encoding to the received data bits such that data bits are in 10 ms units: '01' for '0' and '10' for '1'; and adding thirty (30) time mark bits at the end of the following 10ms bits:

$$2*((500-51) \bmod (85)), 2*((500-51) \bmod (85))+170, 2*((500-51) \bmod (85))+2*170, \ldots, 2*((500-51) \bmod (85))+11*170.$$

Thus, as illustrated in the example implementations FIGS. 4-7, the amount of data bits represented in certain native formatted GNSS SA information signals may be significantly reduced in certain corresponding format modified GNSS SA information signals.

Figure 8:
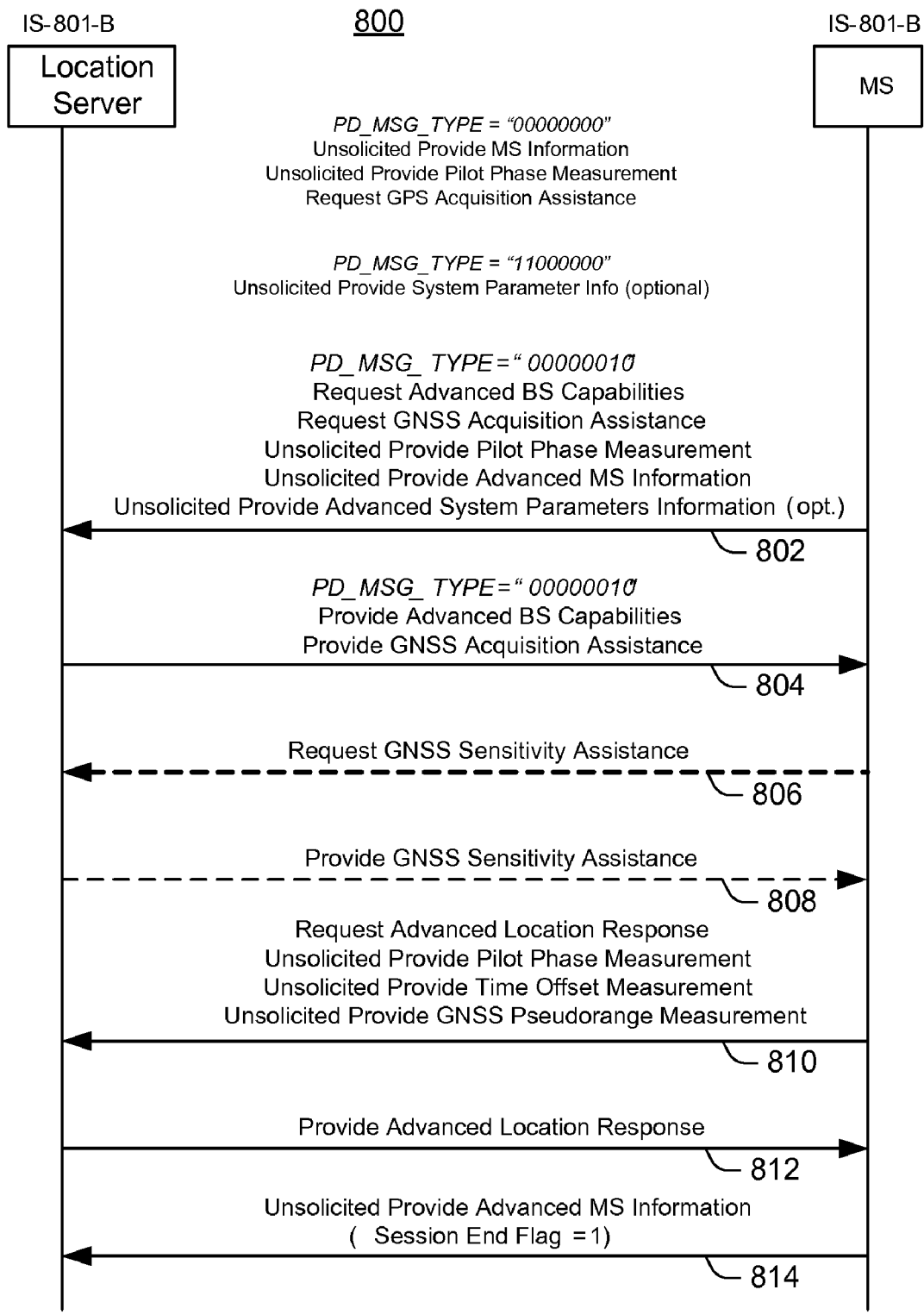
FIG. 8 is a flow diagram illustrating various exemplary message exchanges between two devices enabled to initiate and/or otherwise support a position determination process using GNSS sensitivity assistance information signals, in accordance with certain implementations.

FIG. 8 is a flow diagram illustrating various exemplary PDDM exchanges between a mobile station (MS) and a location server enabled to initiate and/or otherwise support a position determination process using GNSS SA information signals, in accordance with certain implementations. Here, for example, position determination process 800 may be enabled while initiating and/or following initiation of a position determination communication session established using a desired positioning protocol version. By way of example, but not limitation, in this example the desired positioning protocol version may be compliant with IS-801-B since both the location server and MS are IS-801-B compliant. Here, the communication session may, therefore, be negotiated through the acceptance of PD_MSG_TYPE="00000010" (associated with IS-801-B in this example).

In position determination process 800, for example, a MS may transmit one or more message(s) 802 (e.g. PDDMs and/or transport messages) to a location server to request and/or provide certain positioning related information/elements. By way of example but not limitation, as part of IS-801-B message(s) 802 may include a Request Advanced BS Capabilities message, a Request GNSS Acquisition Assistance message, an unsolicited Provide Pilot Phase Measurement message, an unsolicited Provide Advanced MS Information message, and an unsolicited Provide Advanced System Parameters Information message.

At this point in position determination process 800, for example, the MS may measure a pilot phase from all visible base stations and send such measurements to the location server through the Provide Pilot Phase Measurement message. Additionally, the MS may send the Provide Advanced MS Information message (e.g., indicating the MS's desired positioning capabilities), and optionally, the Provide Advanced System Parameters Information message. The MS may send the Request Advanced BS Capabilities message, and a Request GNSS Acquisition Assistance message.

In position determination process 800, for example, the location server may transmit one or more message(s) 804 (e.g. PDDMs and/or transport messages) to the MS to provide certain positioning related information/elements. By way of example but not limitation, as part of IS-801-B message(s) 804 may include a Provide Advanced BS Capabilities message and a Provide GNSS Acquisition Assistance message. As such, for example, at this point in position determination process 800, using the provided pilot phase measurements, the location server may estimate a preliminary position of the MS. This position may be referred to as a prefix. Based on this prefix, the location server may determine one or more search windows for the visible SVs and may send such information to the MS via the Provide GNSS Acquisition Assistance message.

Also as shown with position determination process 800, for example, a MS may transmit one or more message(s) 806 (e.g. PDDMs and/or transport messages) to the location server as part of IS-801-B message(s) 806, such as, a Request GNSS Sensitivity Assistance message in either native or modified formats as previously illustrated. For example, an MS may determine that GNSS Sensitivity Assistance (SA) may be useful in detecting weak signals from a GNSS SV, and as such request such SA information from location server. As shown, the location server may respond by sending one or more message(s) 808, such as, a Provide GNSS Sensitivity Assistance message to the MS. Here, the GNSS SA information signals may be in native or modified format as requested. Thus, for example, the MS may then attempt to use the GNSS SA information received from the location server to continue measuring pseudoranges and possibly re-measure pilot phases.

As shown with position determination process 800, for example, a MS may transmit one or more message(s) 810 (e.g. PDDMs and/or transport messages) to the location server as part of IS-801-B message(s) 810, such as, a Request Advanced Location Response message, an unsolicited Provide Pilot Phase Measurement message, an unsolicited Provide Time Offset Measurement message, and an unsolicited Provide GNSS Pseudorange Measurement message. For example, pseudorange measurement data may be sent to the location server through the Provide GNSS Pseudorange Measurement message. The MS may also provide pilot phase measurement data from the visible base stations again via the Provide Pilot Phase Measurement message. A Provide Time Offset Measurement message may be included, for example, if a carrier is 1X. Along with such measurements, a Request Location Response message may be sent to the location server.

As illustrated in this example, the location server may transmit one or more message(s) 812 to the MS to provide certain positioning related information/elements. By way of example but not limitation, as part of IS-801-B message(s) 812 may include a Provide Advanced Location Response message. Thus, for example, at this point in position determination process 800, using the received measurements from messages 810, a final position of the MS may be determined by the location server and final position information may be sent to the MS to complete the call flow. For example, as illustrated by the response of the MS in sending message(s) 814, the MS may send an unsolicited Provide Advanced MS Information message that includes a Session End Flag set to terminate the session (e.g., here, Session End Flag=1).

As described in the example implementations herein, a request/response mechanism may be provided for sharing GNSS SA information in native or modified formats, wherein a modified format may be implemented to reduce the amount of data information that a location server and/or other like device transmits to a mobile station. Such a request mechanism may allow a mobile station (for example a cellular phone, smart phone, or any wireless device) to request GNSS SA information (e.g., information indicative of GNSS SA) from any combination of GNSS and GNSS signal (for example GPS L1 C/A or GLONASS GI), of any size, of a list of SVs, in either native or modified format. In certain implementations a response mechanism allows a location server and/or other like device to send such GNSS SA information to the mobile station as requested or unsolicited. In certain example implementations, native formatted (e.g., over-the-air) navigation message bits (as may be sent from an SV) may be created by processing original information bits, for example, by including CRC parity check bits, including a preamble, convolutionally encoding the information bits, meander encoding the information bits, and/or performing other applicable processes. Format modified navigation message bits may be represented by information bits, and may include CRC parity check or hamming code bits added, for example, without a preamble, without convolutionally encoding or meander encoding, without certain timing information, and/or the like. The mobile station may, for example, reconstruct the native formatted over-the-air navigation message bits by applying the preamble, convolutionally or meander encoding on the format modified bits, etc., as may be desired.

The GNSS SA information signals may enable data modulation wipeoff for GNSS such as GPS, GLONASS, GALILEO, Compass/BeiDou, QZSS, SBAS, etc. With this feature the sensitivity of an SPS/GNSS receiver may be improved, for example by several dB.

Some example GNSS SA request and response messages have been illustrated for use in sharing GNSS SA information signals. By way of example but not limitation, for a GNSS that uses preambles, and uses meander code or convolutionally encoding in native formatted information signals, the corresponding format modified information signals may not include a preamble, and/or may not include such meander or convolutionally encoding, etc. However, for example, a mobile station may reconstruct the native formatted navigation message bits for modulation wipeoff.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, femtocells, or other network, and regardless of whether satellite signal reception, assistance data reception, and/or position-related processing occurs at the device, at a server, or at another device associated with the network. Any operable combination of the above are also considered a "mobile station."

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it may be intended that claimed subject matter not be limited to the particular examples disclosed, but that such claimed subject matter may also include all aspects falling within the scope of appended claims, and equivalents thereof.

What is claimed is:

1. A machine-implemented method for use in a wireless communication network, the method comprising:
    providing modified format Global Navigation Satellite System (GNSS) Sensitivity Assistance (SA) information derived from predicted GNSS signal data according to a type of GNSS system, the type of GNSS system having a native-formatting for GNSS signals, the native formatting having characteristics comprising one or more of an error correction encoding, preamble information, and time mark information, the modified format GNSS Sensitivity Assistance (SA) information comprising the predicted GNSS signal data encoded without one or more of the characteristics used in the native formatting; and
    sending the modified format GNSS SA information as one or more signals over a communication link from a location server operatively enabled to provide position location assistance to a mobile station having a GNSS receiver capable of receiving and decoding native formatted signals according to the type of GNSS system.

2. The method as recited in claim 1, wherein the providing modified format GNSS SA information comprises formatting the modified format GNSS SA information with one or more of a hamming code and meander encoding, but lacking time mark data.

3. The method as recited in claim 1, further comprising
producing native-formatted Global Navigation Satellite System (GNSS) Sensitivity Assistance (SA) information comprising the predicted GNSS signal data; and
using the produced native-formatted Global Navigation Satellite System (GNSS) Sensitivity Assistance (SA) information as a basis for performing the act of providing.

4. The method as recited in claim 1, further comprising obtaining native-formatted GNSS information and producing the predicted GNSS signal data responsive to a request from the mobile station, the request specifying the one or more of the characteristics of the native formatting not used in the modified format.

5. The method as recited in claim 4, wherein the producing of the predicted GNSS signal data comprises producing GNSS signal data as would have been received by the mobile station from a satellite.

6. The method as recited in claim 1, wherein the act of sending is performed by transmitting at least one Position Determination Data Message (PDDM) comprising the modified format GNSS SA information.

7. The method as recited in claim 1, wherein the act of sending is performed by transmitting the modified format GNSS SA information in a provide element of at least one Position Determination Data Message (PDDM).

8. The method as recited in claim 6, further comprising sending said at least one PDDM unsolicited.

9. The method as recited in claim 6, wherein the act of sending is performed in response to said location server receiving at least one soliciting PDDM from said mobile station, said at least one soliciting PDDM comprising a request for SA data.

10. The method as recited in claim 9, wherein said request element signals comprise an indicator signal identifying the type of GNSS system.

11. The method as recited in claim 10, wherein the type of satellite positioning system is at least one of a GPS resource, an SBAS resource, a QZSS resource, a GLONASS resource, a Galileo resource, and/or a Compass/BeiDou resource.

12. A method to be performed in a mobile device having a Global Navigation Satellite System (GNSS) receiver, the method comprising:
receiving one or more format modified Global Navigation Satellite System (GNSS) sensitivity assistance (SA) information signals over a communication link, the format modified GNSS SA information signals comprising predicted GNSS signal data according to a type of GNSS receiver in the mobile device, the format of the signal data being in a native format of GNSS signal data for that type of GNSS receiver excepting exclusion of one or more formatting characteristics comprising preamble, error correction encoding, and time mark information; and
attempting to acquire at least one GNSS signal by the GNSS receiver in the mobile device using the predicted GNSS signal data from the GNSS SA information signal to increase sensitivity of the receiver.

13. The method as recited in claim 12, wherein the attempting to acquire comprises reconstructing the native format GNSS signal by operations including adding time mark symbols to the predicted GNSS signal data.

14. The method as recited in claim 13, wherein the native format GNSS signal comprises preamble information signals and the predicted GNSS signal data excludes preamble information signals.

15. The method as recited in claim 13, further comprising adding time mark information to the received format modified GNSS SA information signals.

16. The method as recited in claim 13, wherein the act of attempting to acquire at least one GNSS signal comprises
creating one or more native formatted GNSS SA information signals based on the predicted GNSS signal data received in the one or more format modified GNSS SA information signals, using a reference time signal received by the mobile device.

17. The method as recited in claim 12, wherein said one or more format modified GNSS SA information signals is received via at least one Position Determination Data Message (PDDM).

18. The method as recited in claim 17, further comprising:
receiving said one or more format modified GNSS SA information signals in a provide element of said at least one PDDM.

19. The method as recited in claim 17, further comprising:
sending at least one soliciting PDDM from said mobile station to a location server,
said at least one soliciting PDDM comprising request element signals.

20. The method as recited in claim 19, wherein said request element signals comprise an indicator signal indicating a request to receive SA information without preamble bits.

21. The method as recited in claim 19, wherein said request element signals comprise an indicator signal indicating a request to receive SA information without convolutional encoding and without time mark information.

22. The method as recited in claim 12, wherein said one or more format modified GNSS SA information signals are modified from a format associated with at least one of a GPS resource, an SBAS resource, a QZSS resource, a GLONASS resource, a Galileo resource, and/or a Compass/BeiDou resource.

23. An apparatus for use in providing position location assistance to a mobile station within a wireless communication network, the apparatus comprising:
means for obtaining native-formatted Global Navigation Satellite System (GNSS) Sensitivity Assistance (SA) information comprising predicted GNSS signal data having formatting characteristics comprising one or more of an error correction encoding, preamble information, and time mark information, the formatting characteristics determined according to a type of Global Navigation Satellite System;
means for providing modified format GNSS SA information derived from the predicted GNSS signal data from the native-format GNSS SA information; and
means for sending the modified format GNSS SA information as one or more signals over a communication link from a location server operatively enabled to provide position location assistance to the mobile station.

24. The apparatus as recited in claim 23, wherein the means for obtaining native-formatted GNSS SA information comprises a GNSS receiver and a means for producing predicted GNSS signal data for the mobile station.

25. The apparatus as recited in claim 24, wherein the means for providing the modified format GNSS SA information is operable to exclude preamble information in said one or more native-formatted GNSS SA information signals.

26. The apparatus as recited in claim 24, wherein the means for providing the modified format GNSS SA information is operable to exclude, from the modified format GNSS SA information, time mark information signals in said one or more native-formatted GNSS SA information signals.

27. The apparatus as recited in claim 24, wherein the means for obtaining comprises a means for receiving native-formatted GNSS signals from a satellite.

28. The apparatus as recited in claim 23, further comprising:
means for receiving at least one soliciting message from said mobile station, said at least one soliciting message comprising request element signals identifying at least one modification to the native format of the GNSS SA information signals.

29. The apparatus as recited in claim 23, wherein said one or more format modified GNSS SA information signals are associated with at least one GNSS resource comprising at least one of a GPS resource, an SBAS resource, a QZSS resource, a GLONASS resource, a Galileo resource, and/or a Compass/BeiDou resource.

30. An apparatus for use in a mobile station operatively enabled to receive position location assistance within a wireless communication network, the apparatus comprising:
means for receiving at least one message, from a location server, said at least one message comprising one or more format modified Global Navigation Satellite System (GNSS) sensitivity assistance (SA) information signals comprising predicted GNSS signal data in a format for a type of GNSS receiver in the mobile station, except that one or more formatting characteristics selected from an error correction encoding, preamble information, and time mark information are excluded; and
means for acquiring at least one GNSS signal using at least a portion of said one or more received GNSS SA information signals.

31. The apparatus as recited in claim 30, wherein the modified format GNSS SA information signals lack time mark information and further comprising:
means for creating one or more native format GNSS SA information signals comprising time mark information corresponding to said received one or more format modified GNSS SA information signals, using a time signal reference; and
wherein said means for acquiring said at least one GNSS signal uses the created one or more native format GNSS SA information signals.

32. The apparatus as recited in claim 30, wherein the format modified GNSS SA information signals lack preamble information and further comprising means for creating one or more native formatted GNSS SA information signals comprising preamble information, based on the format modified GNSS SA information signals.

33. The apparatus as recited in claim 31, further comprising:
means for creating native formatted GNSS data from the SA information signals corresponding to said received one or more format modified GNSS SA information signals.

34. The apparatus as recited in claim 30, further comprising:
means for sending at least one soliciting message to said location server, said at least one soliciting message specifying format modifications to be made to the GNSS data to be received from the location server.

35. The apparatus as recited in claim 34, wherein the format modifications are specified with respect to a native format of a GNSS system type selected from GPS, SBAS, QZSS, GLONASS, Galileo, and Compass/BeiDou.

36. A location server apparatus for use in providing position location assistance to a mobile station within a wireless communication network, the location server apparatus comprising:
a signal processor operatively enabled to produce predicted GNSS signal data for use in Global Navigation Satellite System (GNSS) sensitivity assistance (SA) information signals, to be transmitted to the mobile station, the predicted GNSS data based at least in part on one or more received GNSS signals and being format modified to exclude one or more formatting characteristics of preamble information, error correction encoding and time mark information present in native format GNSS signals; and
a transmitter operatively coupled to at least said signal processor and operable to send the GNSS SA information to the mobile station.

37. The location server apparatus as recited in claim 36, wherein the native format GNSS SA information signals comprise preamble information signals and the format modifications comprise excluding preamble information from the GNSS SA information sent to the mobile station.

38. The location server apparatus as recited in claim 36, wherein the native format comprises time mark information and the format modifications comprise excluding time mark information from the GNSS SA information sent to the mobile station.

39. The location server apparatus as recited in claim 36, further comprising: a receiver for receiving at least one soliciting message sent by said mobile station, said at least one soliciting message comprising a request for GNSS SA information according to a specified type of GNSS system.

40. The location server apparatus as recited in claim 39, wherein the type of GNSS is specified as one of a GPS resource, an SBAS resource, a QZSS resource, a GLONASS resource, a Galileo resource, and/or a Compass/BeiDou resource.

41. An apparatus for use in a mobile station operatively enabled to receive position location assistance within a wireless communication network, the apparatus comprising:
a wireless communication network interface operatively enabled to receive at least one message, from a location server, said at least one message comprising Global Navigation Satellite System (GNSS) sensitivity assistance (SA) information signals derived from predicted GNSS signal data according to a type of GNSS system, the type of GNSS system having a known native-formatting for GNSS signals, the native formatting having characteristics comprising one or more of an error correction encoding, preamble information, and time mark information, the GNSS Sensitivity Assistance (SA) information comprising the predicted GNSS signal data encoded without one or more of the characteristics used in the native formatting; and
a GNSS receiver operatively enabled to acquire GNSS signals using the received GNSS SA information signals.

42. The apparatus as recited in claim 41, further comprising:
a signal processor operatively enabled to produce native formatted GNSS information corresponding to said received GNSS SA information signals; and
wherein said GNSS receiver is operatively enabled to selectively acquire GNSS signals using the produced native formatted GNSS information.

43. The apparatus as recited in claim 41, wherein said GNSS SA information signals are based on GNSS signals received by the location server.

44. The apparatus as recited in claim 43, wherein said native formatting comprises preamble information signals and said GNSS SA information signals are received without preamble information signals.

45. The apparatus as recited in claim 43, wherein said native formatting comprises time mark information and said GNSS SA information signals are received without time mark information.

46. The apparatus as recited in claim 45, wherein said signal processor is operatively enabled to establish native formatted GNSS SA information, using a reference time signal.

47. The apparatus as recited in claim 42, wherein said signal processor is operatively enabled to establish at least one GNSS signal based on the received GNSS SA information.

48. The apparatus as recited in claim 41, wherein said wireless communication network interface is operatively enabled to send at least one soliciting message to said location server, said at least one soliciting message comprising a request for eGNSS SA information, and one or more format modifications to be made to the GNSS SA information, compared with native formatting of GNSS signals for a type of GNSS signal capable of being received by the receiver.

49. The apparatus as recited in claim 48, wherein the type of GNSS signal capable of being received is at least one of a GPS resource, an SBAS resource, a QZSS resource, a GLONASS resource, a Galileo resource, and/or a Compass/BeiDou resource.

50. An article comprising:
a non-transitory computer readable medium having computer implementable instructions stored thereon to perform a method comprising:
establishing one or more format modified Global Navigation Satellite System (GNSS) sensitivity assistance (SA) information signals based, at least in part, on one or more received GNSS signals, the format modified GNSS SA information comprising modifications to one or more of preamble information, error correction encoding and time mark information, compared to a native format of a type of GNSS system that transmitted the received GNSS signals, and further comprising predicted GNSS signal data encoded without one or more of characteristics used in the native format; and
initiating transmission of said one or more the format modified GNSS SA information signals over a communication link to a mobile station, said one or more format modified GNSS SA information signals being transmitted via at least one message.

51. The article as recited in claim 50, wherein the establishing comprises removing preamble information from the native format in establishing the format modified GNSS SA information.

52. The article as recited in claim 50, wherein the establishing comprises excluding time mark information from the GNSS SA information.

53. The article as recited in claim 50, wherein the method further comprises
accessing at least one soliciting message from said mobile station, said at least one soliciting message comprising requested format modifications to a native format of GNSS information capable of being received by a GNSS receiver in the mobile station.

54. A non-transitory article of machine readable media having stored thereon machine executable instructions for a method to be performed in a mobile station comprising:
accessing at least one message from a location server, said at least one message comprising one or more format modified Global Navigation Satellite System (GNSS) sensitivity assistance (SA) information signals the format modified GNSS SA information comprising modifications to one or more of preamble information, error correction encoding and time mark information, compared to a native format of a type of GNSS system receiver available to the mobile station, and further comprising predicted GNSS signal data encoded without one or more of characteristics used in the native format; and
providing at least a portion of said one or more GNSS SA information signals to the GNSS system receiver operatively enabled to acquire at least one GNSS signal using the provided GNSS SA information signals.

55. The article as recited in claim 54, wherein the method further comprises adding time mark information to the received format modified GNSS SA information in creating native formatted GNSS SA information.

56. The article as recited in claim 54, wherein the method further comprises creating one or more native formatted GNSS SA information signals based on the format modified GNSS SA information and at least one reference time signal.

57. The article as recited in claim 54, wherein the method further comprises:
initiating transmission of a soliciting message to said location server, said at least one soliciting message comprising request element signals identifying a type of GNSS resource.

58. The article as recited in claim 57, wherein the type of GNSS resource is one of a GPS resource, an SBAS resource, a QZSS resource, a GLONASS resource, a Galileo resource, and/or a Compass/BeiDou resource.

* * * * *